United States Patent [19]

Mulgrave

[11] Patent Number: 5,710,474
[45] Date of Patent: Jan. 20, 1998

[54] BRUSHLESS DC MOTOR

[75] Inventor: Robert L. Mulgrave, Sandown, N.H.

[73] Assignee: Cleveland Machine Controls, Cleveland, Ohio

[21] Appl. No.: 494,405

[22] Filed: Jun. 26, 1995

[51] Int. Cl.$^6$ .................................................. H02K 37/00
[52] U.S. Cl. .................. 310/254; 310/44; 310/85; 310/89; 310/156; 310/179; 310/180; 310/184; 310/185; 310/189; 310/208
[58] Field of Search ................ 310/254, 85, 89, 310/156, 310, 179, 180, 184, 185, 198, 208, 44

[56] References Cited

U.S. PATENT DOCUMENTS

| | | | |
|---|---|---|---|
| 4,017,964 | 4/1977 | Schulte et al. | 310/89 |
| 4,130,769 | 12/1978 | Karube . | |
| 4,143,289 | 3/1979 | Williams . | |
| 4,317,072 | 2/1982 | Goof et al. . | |
| 4,445,061 | 4/1984 | Jackson, Jr., . | |
| 4,529,902 | 7/1985 | Lordo | 310/112 |
| 4,547,713 | 10/1985 | Langley et al. . | |
| 4,667,123 | 5/1987 | Denk et al. . | |
| 4,733,118 | 3/1988 | Mihalko . | |
| 4,837,468 | 6/1989 | Froment | 310/42 |
| 4,866,319 | 9/1989 | Crutchfield | 310/47 |
| 4,937,485 | 6/1990 | Mihalko . | |
| 5,126,561 | 6/1992 | Nakazawa et al. | 250/230 |
| 5,250,867 | 10/1993 | Gizaw | 310/179 |
| 5,523,637 | 6/1996 | Miller | 310/156 |

*Primary Examiner*—Steven L. Stephan
*Assistant Examiner*—Karl E. I. Tamai
*Attorney, Agent, or Firm*—Vickers, Daniels & Young

[57] ABSTRACT

An improved, brushless, slot-less DC motor is disclosed which includes a plurality of ring shaped permanent rotor magnets affixed to the motor shaft and magnetized to have contiguous pole faces extending about the circumference thereof. A module plastic housing impregnated with powder metal particles is provided as a magnetic shunt to eliminate prior art ferrite-oxide laminations while assuring concentration of the rotor's magnetic flux into coils positioned in the physical air gap between the rotor and stator housing.

20 Claims, 5 Drawing Sheets

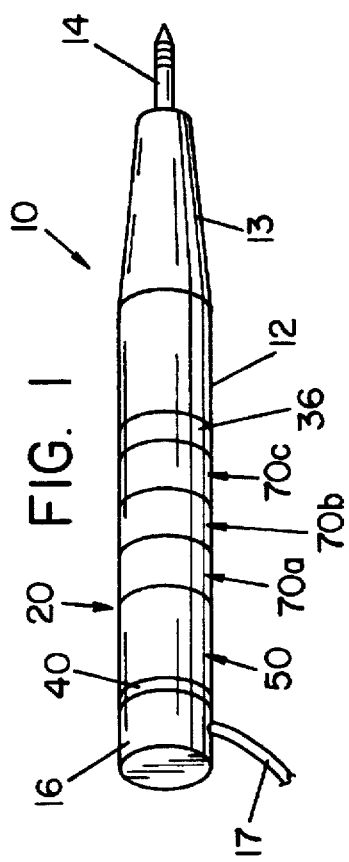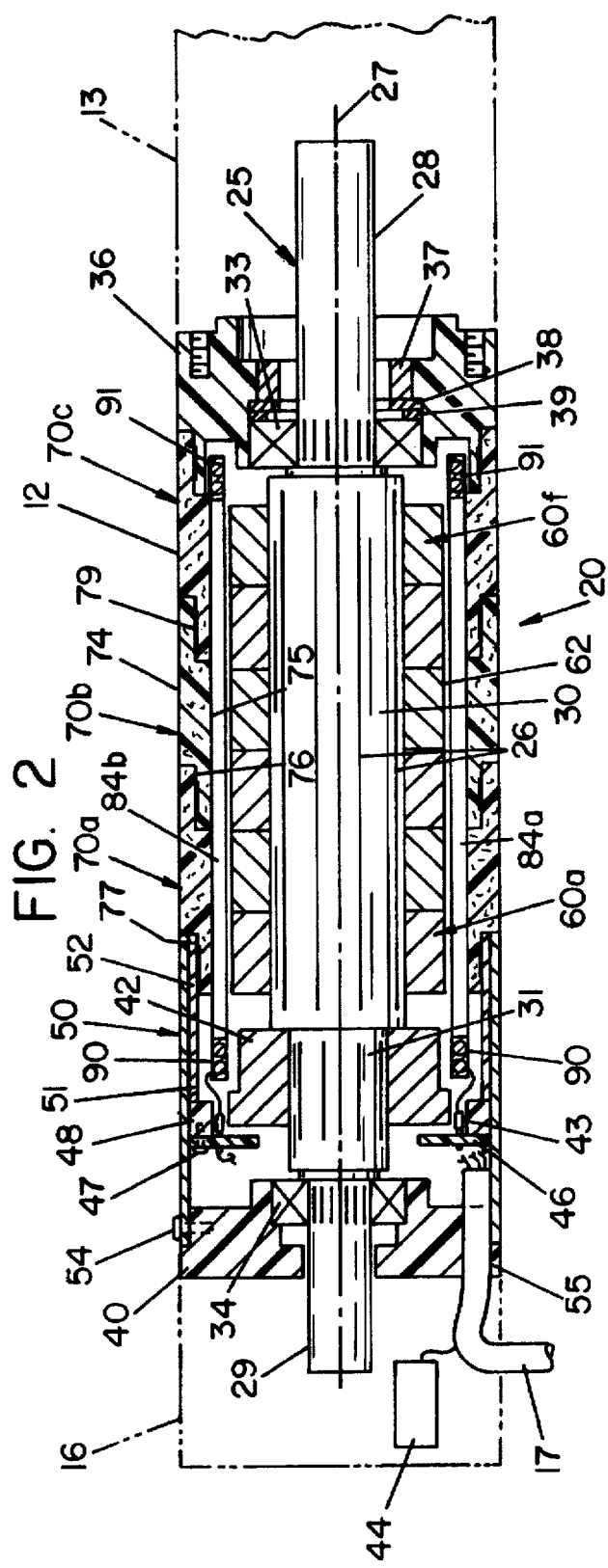

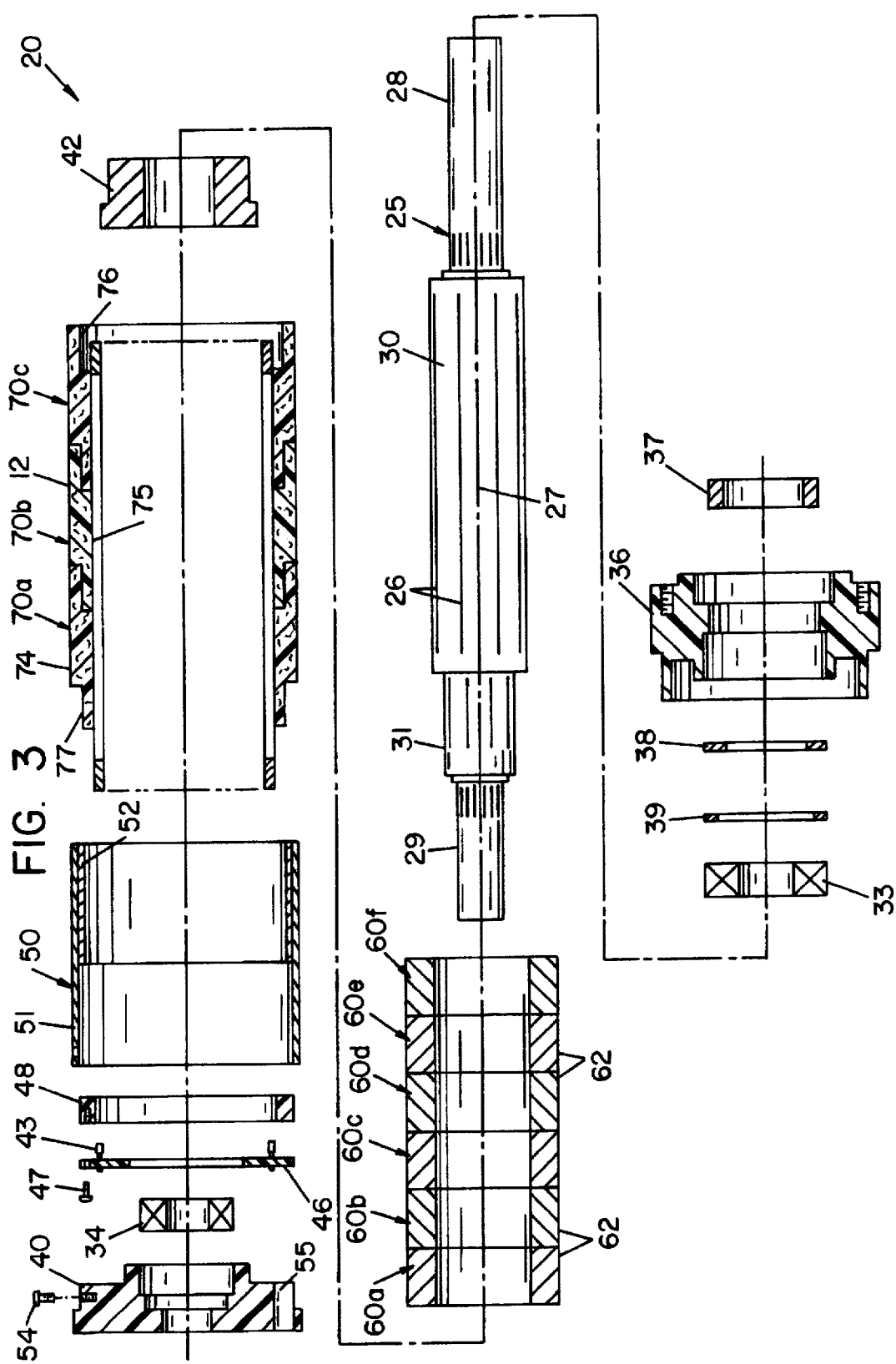

BRUSHLESS DC MOTOR

This invention relates generally to electric motors and more particularly to brushless electric motors.

The invention is particularly applicable to and will be described with specific reference to a brushless, slotless high speed DC motor where it has proven itself capable of generating high efficiencies with high torque output. However, those skilled in the art will understand that the invention has broader applications and could function as a generator or AC motor.

INCORPORATION BY REFERENCE

The following patents are incorporated by reference herein and made a part hereof so that the specifications hereof which follow need not explain in that detail what is already known in the art. The material incorporated herein by reference, while useful in understanding the present invention and appreciating its benefits over the art, does not, per se, form any part of the present invention.

1) U.S. Pat. No. 4,937,485 to Mihalko, issued Jun. 26, 1990, entitled "Coil/Magnet Structure for a Brushless DC Motor".

2) U.S. Pat. No. 4,733,118 to Mihalko, issued Mar. 22, 1988, entitled "Low Damping Torque Brushless D.C. Motor".

3) U.S. Pat. No. 4,130,769 to Karube, issued Dec. 19, 1978, entitled "Brushless DC Motor".

4) U.S. Pat. No. 4,445,061 to Jackson, Jr., issued Apr. 24, 1984, entitled "Wide Air Gap Permanent Magnet Motors".

5) U.S. Pat. No. 4,667,123 to Denk et al, issued May 19, 1987, entitled "Two Pole Permanent Magnet Rotor Construction for Toothless Stator Electrical Machine".

6) U.S. Pat. No. 4,547,713 to Langley et al, issued Oct. 15, 1985, entitled "Toroidally Wound Brushless DC Motor".

7) U.S. Pat. No. 4,143,289 to Williams, issued Mar. 6, 1979, entitled "Rotational Field Sensor".

8) U.S. Pat. No. 4,317,072 to Goof et al, issued Feb. 23, 1982, entitled "Electric Motor with Rotational Speed Regulation".

BACKGROUND

The advantages that brushless motors have over conventional DC motors are well known. Brushless DC motors produce their output torque as a result of the interaction between a magnetic field produced by the permanent magnet rotor and a magnetic field due to a DC current in the stator structure. This arrangement, when compared to conventional brush type motors makes it easier to remove heat produced in the active windings while producing a more thermally stable device.

Despite such advantages, motor losses still occur in brushless motors and result in inefficiencies. Motor losses can typically be viewed as falling within two classes.

First, there are load or torque sensitive losses which are generally limited to winding losses that are proportional to the square of the current passing through the windings times the resistance of the windings. Windings typically comprise copper or aluminum conductors and the electrical resistance for such metals increase with temperature. Thus, torque losses increase when the motor heats up.

The second category for losses are speed sensitive losses which are proportional to the motor's speed. For brushless motors, the dominant losses are attributed to eddy currents and the hysteresis effect as well as short circuit currents. As is well known, eddy currents are phenomena caused by a change of magnetic field or flux through a medium that can also support a flow of electric current. In the case of brushless motors, the housing portion of the motor has a potential voltage induced in it and produces eddy currents. The induced eddy currents are proportional to speed and can have a significant heating effect on the motor, especially for small motors to which the present invention relates when operated at high speeds.

Somewhat aside from motor losses, there are simply efficiencies of design considerations which can be viewed as arrangements in which maximum magnetic energy is efficiently utilized by the stator coils. Yet, it should be noted that a design change resulting in better utilization of maximum magnetic energy could be correlated to a reduction in motor loss. For example, certain brushless motor designs of the type to which this invention relates, utilize coils situated in the physical air gap between rotor and stator. Because the coils are self-supporting, there is no need to slot the stator for containing electrical conductor windings typically present in conventional brushless motor designs. Such "slotless" designs eliminate variations in torque and speed attributed to variations in the magnetic flux as the rotor poles move past the stator poles, i.e. "cogging". Thus, a slotless motor design results in better utilization of the magnetic energy since it eliminates "cogging" and improves motor efficiency. At the same time the improved efficiency could be viewed as attributed to a reduction in a speed sensitive loss.

In any event, two prior art designs of the slotless, brushless type exist. One prior art design directed to improved efficiency of brushless motors is disclosed in Mihalko U.S. Pat. Nos. 4,733,118 and 4,937,485 incorporated by reference herein. Mihalko utilizes conventional coils arranged between a pair of impregnated fiberglass/epoxy sheets which are situated in the air gap of the motor thus resulting in a conventional slotless, brushless motor design. Mihalko utilizes expensive, high coercive, rare earth magnets, such as NEIGHT 27H, which have a MGOe (megagauss-oersteds) rating of 32 in a rotor arrangement where the pole faces are physically separated from one another. Insulated laminations (disclosed as electrical iron as contrasted to conventional soft magnetic discs of annealed steel), in practice, are inserted between motor housing and coils to provide a low eddy current return path and function as a magnetic shunt while also insuring that the flux is directed into the coils in the air gap. Mihalko does mention that a design without laminations can be employed, apparently with a thin metal housing, and apparently in the belief that the high coercive nature of his magnets will, in and of itself, develop sufficient flux directed into the coils. In practice, tests conducted on motors constructed in accordance with Mihalko's teachings disclose efficiencies in the neighborhood of 40% when the motors are operated at 10,000 rpm. The relatively low efficiency is believed, among other reasons, attributed to the inefficient use of the permanent rotor magnets resulting from the spacings between the pole faces as well as, perhaps, short circuits attributed to the high coercive nature of the magnets. In general summary this type of design requires expensive, rare earth magnets and expensive and difficult to assemble laminations while achieving efficiencies which are not viewed as significant.

Karube U.S. Pat. No. 4,130,769, also incorporated by reference herein, discloses a brushless, slotless motor perhaps more closely related to the present invention than the Mihalko design. Like Mihalko, Karube utilizes coils arranged in a cylindrical array within the physical air gap.

Soft magnetic laminations which are juxtaposed the coils minimize eddy currents, provide a magnetic shunt and direct or concentrate the permanent magnet's flux into the air gap containing the coils. Karube discloses a unitary, cylindrical magnet affixed to his shaft which is described as being magnetized in the radial direction to have four magnetic poles. Conventionally, cylindrical magnets of this type do not have magnetized pole faces which physically extend circumferentially to the adjacent pole face. As noted by Mihalko, such magnets produce an ill-defined magnetic field at adjacent poles. Nevertheless, Karube is believed more efficient than Mihalko since more magnetic energy of Karube's magnet is directed into the coil than that of the Mihalko design. At the same time, Karube's design is fundamentally not as efficient in the utilization of the rotor's permanent magnetic flux, and like Mihalko, requires laminations to provide a magnetic shunt.

In general summary of the prior art, brushless, slotless motor designs do not achieve efficiencies otherwise possible and do require laminations to function as a magnetic shunt and reduce eddy current losses which increase the cost of the motor while also requiring special assembly techniques.

SUMMARY OF THE INVENTION

Accordingly, it is a principal object of the invention to provide a brushless, slotless motor which better utilizes the magnetic energy of the rotor's permanent magnets to achieve high efficiencies in a design which is fundamentally simpler and more economical than that of the prior art.

This object along with other features of the invention is achieved in a brushless, slotless motor which includes a rotor having a longitudinally extending rotable shaft and an annular permanent magnet affixed to the shaft and rotable therewith. Importantly, the magnet has a continuous, magnetized outer cylindrical edge surface defining a plurality of arcuate pole faces juxtaposed to one another with each pole face having a polarity opposite that of an adjacent, juxtaposed pole face so as to generate high intensity, substantially unidirectional magnetic field lines at the pole faces thus providing a permanent magnet arrangement which utilizes efficiently the magnetic energy of a ring magnet. A plurality of stator coils are formed in a cylindrical array spaced radially outward from the permanent magnet's cylindrical edge surface but closely juxtaposed thereto without any intervening ferromagnetic material between the coils and each coil has electrical conductors formed in an array of a predetermined number of turns and including at least two (2) parallel sides with center lines arranged generally parallel to the center line of the rotor shaft. A housing surrounds the coils and rotor and a somewhat conventional communication sensing mechanism and a conventional control arrangement is utilized to provide power to selected coils in response to the sensing mechanism.

In accordance with a separate aspect of the invention, the polarity of the pole faces is better achieved (with resulting better utilization of the magnetic energy) by utilizing a plurality of cylindrical magnetic rings affixed side by side onto the shaft with pole faces and polarities aligned with one another to extend a longitudinal distance approximately equal to that of each coil's parallel sides to assure generation of well defined magnetic fields at adjacent poles.

In accordance with another feature of the invention, each coil has a radial width extending between its parallel sides with the radial width of the coils being less than the radial width of each pole face thus permitting all the magnetic energy of the magnetic rotor to pass through each coil as the rotor rotates relative to the coil thus achieving better utilization of the energy of the permanent magnet and a more efficient design. More specifically, good efficiencies have been achieved with magnets having a maximum energy product, MGOe, of only about 10 megagauss-oersteds, which, while a relatively high energy magnet, is nevertheless considerably lower than the maximum energies of rare earth magnets typically used in small brushless motors of the prior art.

In accordance with a particularly important feature of the invention, the cylindrical housing which has an inner cylindrical surface closely juxtaposed to the coils, is formed of a materials functioning as a flux return path to minimize hysterisis and eddy current losses but causing magnetic flux to pass through the annular space between the rotor and housing containing the coils without the need for separate disc laminations required in the prior art. Specifically, the housing material includes a sintered powder metal dispersed, doped or embedded within a plastic material shaped in the form of the housing and, again, functioning in a manner similar to (but improved from) the prior art laminations whether comprised of discs formed of electrical wire separated by oxide coating discs, or, alternatively, soft magnetic discs of annealed steel separated from one another by oxide coating discs to prevent an electrical path.

In accordance with another important aspect of the invention, the housing includes a plurality of ring shaped modules each having a smaller male end and a larger female end so that the male end of one module fits within the female end of an adjacent module, each module being formed in part of a metallic material acting as a shunt whereby the efficiency of the motor is enhanced. Specifically, each housing module includes an annular female member adjacent the female end and an annular male member adjacent the male end with the outside diameter of the male member approximately equal to the inside diameter of the female member whereby the male member extends longitudinally a fixed distance within the female member and is sealed thereto whereby the female member and male member are assembled into one module and the modules when assembled to form the housing provide a smooth continuous inner surface closely juxtaposed to the coils.

In accordance with another aspect of the invention, an improved hand held motor is provided which includes a motor portion including a brushless DC motor which in turn comprises, in combination, a rotor including a steel shaft having an annular, cylindrical permanent magnet affixed thereto with the magnet having a circumferential outer edge surface magnetized to form a plurality of pole faces continuously extending about the edge surface with each pole face juxtaposed an adjacent pole of opposite polarity and having a coercive force generating a substantially unidirectional flux field. In combination with the rotor is a housing surrounding the rotor magnet defining an annular air gap therebetween with the housing being plastic and impregnated with sintered powder metal particles forming a metallic shunt whereby the magnetic field is concentrated in the air gap. A plurality of coils are provided within the air gap with each coil including an electrical conductor formed in a polygonal array having a predetermined number of turns and including at least two sides which are parallel with the centerline of the rotor shaft. A commutation sensing arrangement is provide for detecting the magnitude of polarity of the rotor pole faces and a mechanism for generating current to selected coils actuated by the commutation sensing arrangement is used to rotate the shaft. An adapter portion for carrying a tool chucked to the shaft is provided for rotating and transmitting torque supplied by the shaft.

It is thus an object of the invention to provide an improved brushless motor which utilizes an improved, permanent magnet rotor generating substantially uni-directional magnetic flux over each pole face.

It is another separate object of the invention to provide an improved fluxless motor which eliminates the need of disc shaped laminations while still providing a magnetic shunt minimizing hysteresis and eddy current losses.

Still another object of the invention is to provide an improved brushless motor which achieves high efficiencies in part by means of an improved permanent magnet rotor in combination with coils positioned within the air gap formed in a polygonal configuration having a radial width extending circumferentially less than the rotor's magnetic pole faces to permit all the magnetic energy of the rotor to pass through each coil as the rotor rotates relative to the coil.

In accordance with another object of the invention, an improved brushless, slotless rotor design is provided in which an improved permanent magnet rotor design is disposed within a modular housing also functioning as a magnetic shunt to achieve higher motor efficiencies than heretofore possible.

It is yet another object of the invention to provide an improved brushless, slotless motor design in which the permanent magnetic rotor does not have to be constructed of expensive rare earth magnetic material while achieving efficiencies and performance superior to that of prior art designs requiring the use of expensive rare earth magnets.

It is still yet another feature of the invention is to provide an improved brushless, slotless motor design ideally suited for use as in small, hand held motors in a design which is less costly than prior art designs but significantly easier to assemble than that of the prior art.

Still further features, advantages and objects of the invention will become apparent to those skilled in the art upon reading and understanding the Detailed Description of the preferred embodiment of the invention set forth below taken in conjunction with the drawings described in the next section.

BRIEF DESCRIPTION OF THE DRAWINGS

The invention may take form in certain parts and arrangement of parts, a preferred embodiment of which will be described in detail herein and illustrated in the accompanying drawings which form a part hereof and wherein:

FIG. 1 illustrates a hand held tool, preferably a surgical tool, utilizing the improved brushless, slotless motor of the present invention;

FIG. 2 is a sectioned, longitudinal view of the motor used in the tool of FIG. 1;

FIG. 3 is a longitudinal, exploded view of the motor, mostly in section, of the motor shown in FIG. 2;

DETAILED DESCRIPTION OF THE PREFERRED EMBODIMENT

Figure 4:
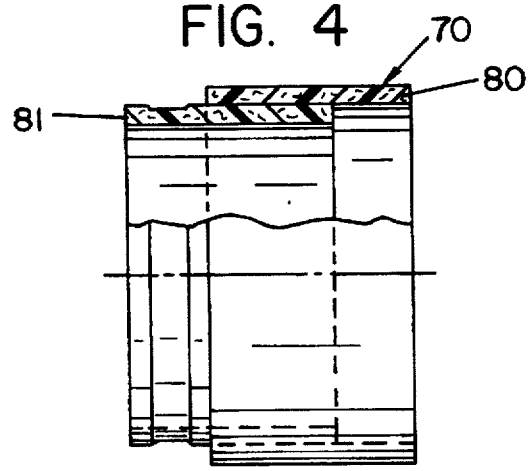
FIG. 4 is a view partly in section of one of the housing modules of the motor of the present invention.

Referring now to the drawings wherein the showings are for the purpose of illustrating preferred embodiments of the invention only and not for the purpose of limiting same, there is shown in FIG. 1, a small, hand held tool 10 driven by an electrical motor 20 including a motor stator housing 12. While the invention is not, per se, limited in size to small motors, the invention has particular application and benefit for use in small hand held electric tools such as a dentist's drill. Such tools operate at high speed and require motor generated constant torque at rated speed. Tool 10 is shown to include an adaptor portion 13 carrying a conventional chuck for releasable engagement with a tool 14, such as a drill bit. At the opposite side of electrical motor housing 12 is a tool end portion 16 through which an electrical conductor 17 carrying electrical power to electrical motor housing 12 extends. It is to be noted that electrical motor housing 12 comprises a portion of the exterior surface of tool 10. In fact, tool 10 is held by electrical motor housing 12 and the invention contemplates that the exterior surface of electrical motor housing 12 will be ground, buffed, polished, etc. (i.e., shaped) without adversely affecting the operation of electric motor.

Referring now to FIGS. 2 and 3, there is shown the electrical motor 20 of the present invention. Electrical motor 20 includes a rotor assembly and a stator assembly. Rotor assembly includes stepped steel shaft 25 which preferably is externally splined at each of its portions, as at external splines 26, to permit assembly of rotor components thereto. Stepped steel shaft 25 has a drive end portion 28 and a rear end portion 29, a longitudinally extending magnet portion 30 adjacent drive end portion 28 and an intermediate Hall sensor portion 31 in between longitudinally extending magnet portion 30 and rear end portion 29. Shaft drive end portion 28 is journaled in a drive end bearing 33 pressed over the splines on drive end portion 28. Similarly, rear end portion 29 is journaled in a rear end bearing 34 pressed over the external splines on rear end portion 29.

Drive end bearing 33 is pressed into an annular drive end housing member 36. Also mounted in drive end housing member 36 is a conventional spring arrangement for axial run-out/assembly purposes which includes at one side of drive end bearing 33 a smaller diameter spacer ring 37, a spring washer 38 and a retainer clip 39. It is understood that also mounted to drive end portion 28 is a chuck or other tool adaptor, not shown, for releasably engaging an appropriate tool 14. Rear end bearing 34 is mounted into an annular rear end housing member 40 through which rear end portion 29 of shaft 25 extends.

Pressed onto intermediate Hall sensor portion 31 of steel shaft 25 is a hollow cylindrical Hall magnet assembly 42. Hall magnet assembly 42 is magnetized to generate the same magnetic flux with the same polarity, etc., as that generated by the permanent magnets of the rotor assembly which will be shortly described. The magnetic flux generated by Hall magnet assembly 42 is detected by Hall effect sensors 43 in a conventional manner. However, Hall effect sensors 43, fixed to housing 12, are in close proximity to Hall magnet assembly 42 and thus assures accurate detection of the position of the magnetic poles of the permanent magnet of the rotor and accurate commutation of motor 20. Importantly, Hall effect sensors 43 are not sensing the magnetic field at the coil edges as done in Karube U.S. Pat. No. 4,130,769, which, as noted by Mihalko in U.S. Pat. No. 4,737,485, is perpendicular to the magnetic field where only flux leakage is detected. Hall effect sensors 43 are in the direction of the magnetic field of Hall magnet assembly 42. Conventional circuitry such as disclosed in Karube U.S. Pat. No. 4,130,769 or Mihalko U.S. Pat. No. 4,937,485 or any other conventional type Hall effect circuitry can be employed. The conventional control circuitry is diagrammatically illustrated in FIG. 2 as a control box 44. Those skilled in the art will understand that control box 44 senses the position of the permanent magnets of the rotor vis-a-vis Hall effect sensors 43 and directs current in response to the sensor position to appropriate coils causing rotation of the rotor assembly including rotor shaft 25.

Hall effect sensors 43 are precisely positioned on a annular mounting plate 46 which, in turn, is secured by threaded fasteners 47 to an annular spacer plate 48 which is pressed within a cylindrical extender housing portion 50 of motor 20. In the preferred embodiment, extender housing portion 50 is ⅛" wall thickness aluminum tubing (such as 6061, 6063 or 2024), and is made up of an outer tube 51 extending the length of extender housing portion 50 and an inner cylindrical tube 52 against which annular spacer plate 48 abuts. Extender housing portion 50 is secured by fasteners 54 to rear end housing portion 40 and at its other end, to electrical motor housing portion 12. Annular mounting plate 46 has openings (not shown) through which the leads of electrical conductor 17 fed through an opening 55 in rear end housing portion 40 are connected to the stator coils (to be described) and Hall effect sensors 43.

Pressed onto splines 26 of longitudinally extending magnetic portion 30 of steel shaft 25 is a plurality of annular or ring permanent magnets, there being six (6) such magnets numbered 60a–f in the preferred embodiment.

The magnetic material chosen for permanent magnet 60 forms one of the underpinnings of the invention. Specifically, the magnetic material chosen is sold under the brand name "Magnequench" and was introduced to the market in 1985 by the Delco Remy business unit of General Motors. The Magnequench materials converts neodymium-iron-boron alloy to an extremely small grain size through a rapid solidification technique called Magnequench. Molten alloy flows under pressure onto a chilled rotating wheel where the alloy is instantaneously cooled at a very high rate to form flakes of Nd—Fe—B. The flakes are crushed into small particle sized powder which form bonded and fully dense neodymium magnets through patented processing methods. The magnetic material chosen in the invention is identified by the Mq1 designation and specifically, the preferred embodiment utilizes a magnetic material identified as Mq1-D 10. A general summary of the magnetic characteristics of the Mq1 family of magnets taken from Delco Remy literature is set forth in Table 1 at the conclusion of the specifications.

A more specific summary of the magnetic and physical characteristics and properties of Mq1-D 10 is set forth in Table 2 reproduced from Delco Remy literature and set forth at the end of the specifications.

The Mq1 products utilize a blend of annealed powder with an epoxy resin which is fed into dies in a cold compaction process to form the magnets which are subsequently oven cured. Such magnets possess two important features utilized in the invention. First, the dimensional shape of ring magnets 60a–f can be closely controlled and, significantly, can be easily machined because the bonded density of the magnet is relatively soft (i.e., Rockwell 30 on the B scale). Secondly, and importantly, Mq1 magnets are isotropic and permit magnetizing along any axis. Specifically, the magnet quench process permits magnetic shapes and dimensions that were previously impractical or impossible.

Figure 9:
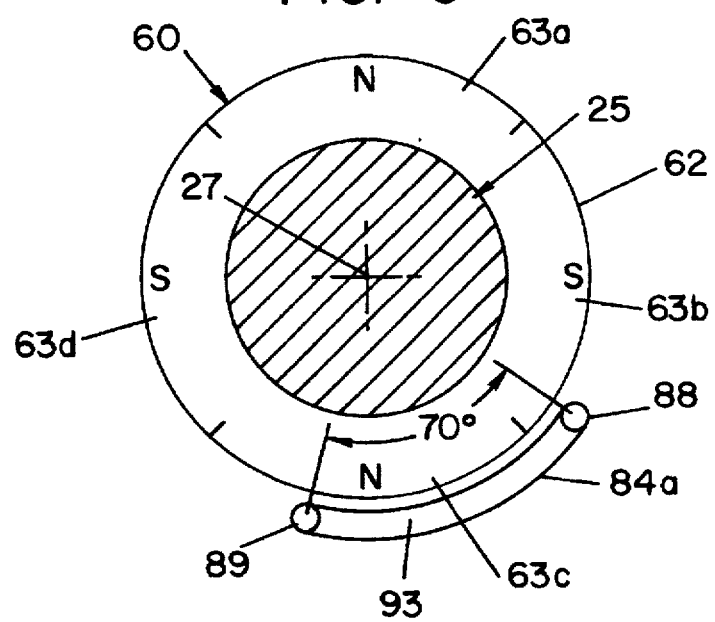
FIG. 9 is a view similar to FIG. 8 but without the motor housing.
Figure 10:
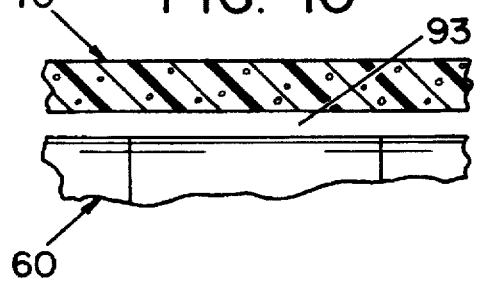
FIG. 10 is a view similar to FIG. 7 but taken through the center of a stator coil where no magnetic material is present.
Figure 11:
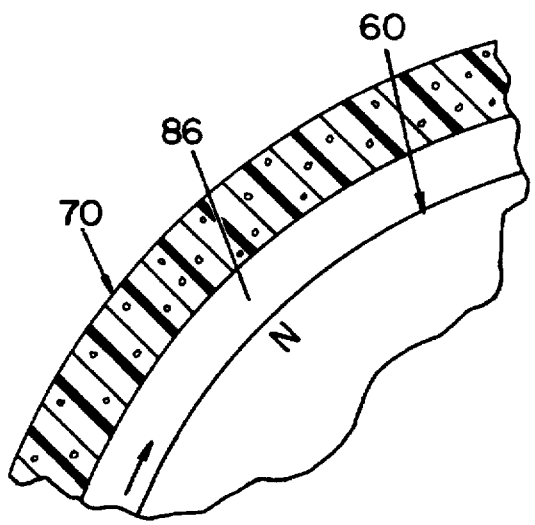
FIG. 11 is a partial cross-sectional view showing the physical air gap of the motor similar to the partial longitudinal view illustrated in FIG. 10.

When applied as ring form magnets 60a–f of the present invention it has been found that the permanent magnets can be magnetized in a manner which can best be described by reference to FIG. 9. Each permanent magnet ring 60a–f has an outer cylindrical edge surface 62 which defines the pole face of the magnet. It has been found that each ring 60a–f can be magnetized in a radial direction so that the pole faces of the magnet can extend to or be immediately adjacent or juxtaposed adjacent pole faces without "short circuits" when applied to motor 20 of the present invention. In the preferred embodiment, each magnet is magnetized to have four (4) pole faces 63a–d extending over an arcuate distance of 90° along cylindrical outer edge surface 62. The magnetization is such that each pole face 63a–d is adjacent a pole face of opposite polarity as shown in FIG. 9. Further, while four pole faces are preferred, in theory, ring magnets 60a–f could be magnetized to have a higher even number of pole faces.

Importantly, it was determined that when the magnetic material was formed into a plurality of permanent magnetic rings 60a–f, the magnetization of the magnetic poles as described with reference to FIG. 9 is achieved. In theory, one hollow, cylindrical rotor permanent magnet can be applied to completely span longitudinally extending magnet portion 30 of steel shaft 25. In practice, rotor permanent magnet 60 is formed of a plurality of magnetic rings 60a–f to achieve the desired magnetic flux properties. It is to be understood that the rotor assembly of motor 20 is achieved by press fitting permanent magnet rings 60a–f onto shaft 25 and then machining, if need be, circumferential edge 62 of all ring magnets 60a–f to closely controlled diameter tolerances followed by magnetizing the assembled ring magnets 60a–f in a conventional manner to produce the magnetic pole faces as described herein.

Referring now to FIGS. 2, 3, 4, and 5, electric motor housing portion 12 includes a plurality of housing modules 70, there being three (3) such housing modules 70a–c in the preferred embodiment which are assembled together and connected between extended housing portion 50 and drive end housing portion 36. Modules 70 are plastic, preferably an epoxy base doped with magnetic sintered powder metals. The powder metals include pure iron, iron phosphorus alloys, iron-silicon alloys, prealloys of nickel and iron and ferritic stainless steels. It is known that typical applications for pure iron materials are flux return paths with DC motors because of the dominant magnetic saturation induction property of iron. However, pure iron powders are susceptible to nitrogen aging which is characterized by an increase in the coercive force after being exposed to elevated temperature for prolonged periods. As a result, magnetic performance can deteriorate with time. Iron phosphorus shows reduced susceptibility to nitrogen aging and is the powder metal used in the preferred embodiment. Specifically, Ancorsteel Tc 80, a steel available from Hoeganaes Corporation is utilized for the powder metal in the preferred embodiment although any of the Ancorsteel 1000 series of iron phosphorous materials would be acceptable.

Figure 5:
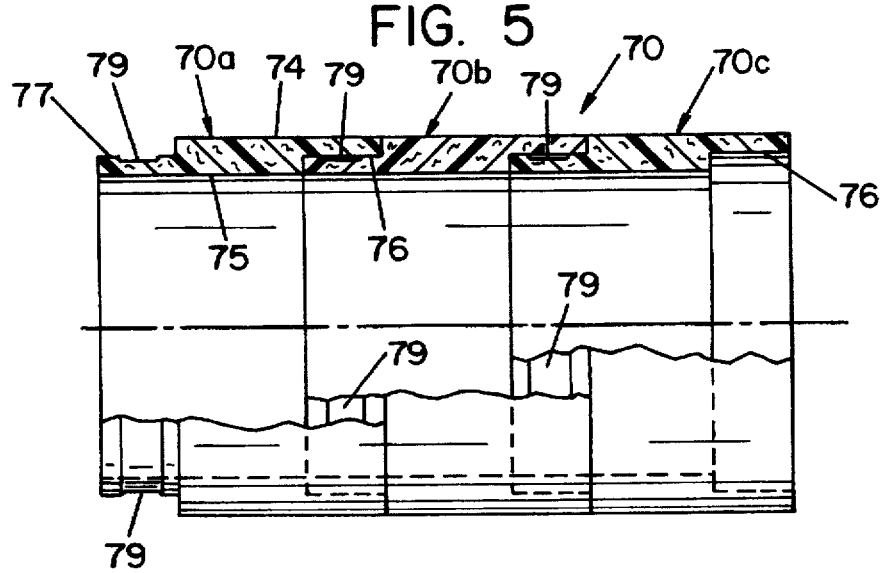
FIG. 5 is a view partly in section showing several housing modules assembled together.
Figure 6:
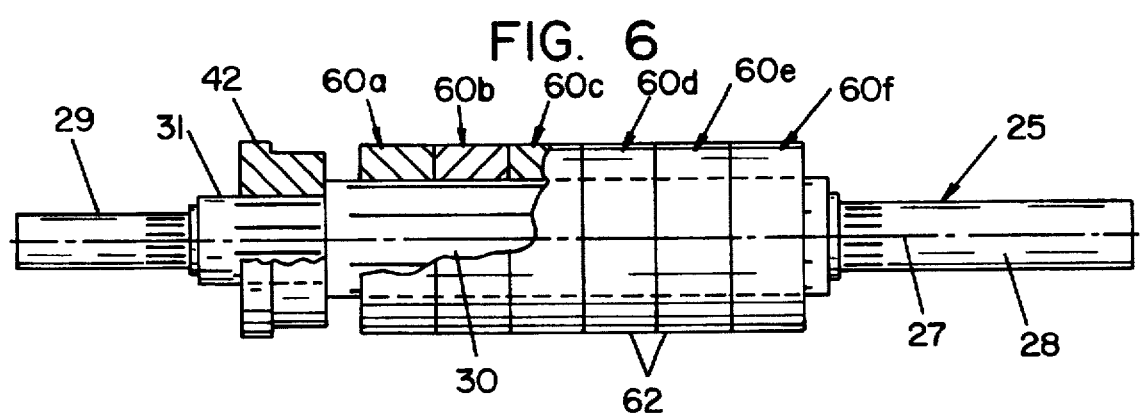
FIG. 6 is a longitudinal view of the rotor of the present invention, partially in section.
Figure 7:
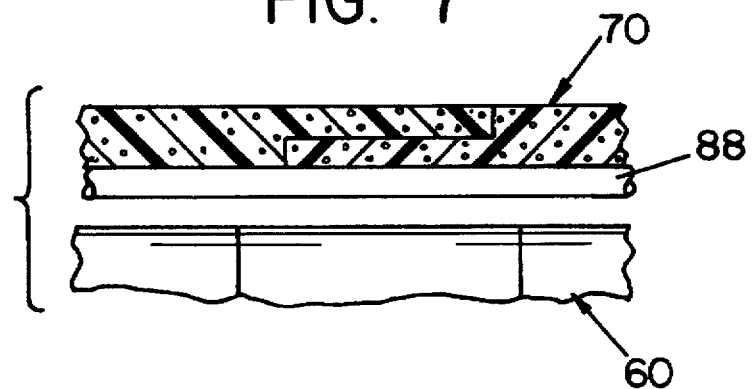
FIG. 7 is a partial, longitudinally sectioned view of the motor showing a coil conductor in the air gap between the magnet and the housing.

Each housing module 70a–c could be formed as a one piece structure as shown in FIGS. 2, 3 and 5. Each housing module 70a–c has a smooth cylindrical outer surface 74, a smooth cylindrical inner surface 75, a female end 76 at one end thereof, and a male end 77 at the other end thereof. Modules 70a–c are assembled by applying an adhesive to a groove 79, relatively rotating one module to the other 360° and holding them axially together under light pressure to permit the adhesive to set. An epoxy adhesive is used in groove 79 to fix first module 70a to extender housing portion 50 and a similar adhesive is used to assemble female end 76 of module 70c to front end housing portion 36.

FIG. 4 shows an alternative embodiment of module 70. In fact, FIG. 4 is the preferred embodiment for housing modules 70a–c. Housing module 70 is constructed from two rings, namely, an outer ring 80 which receives an inner ring 81. Inner ring 81 is disposed within outer ring 80 a fixed longitudinal distance so as to replicate the one piece modules 70a–c illustrated in FIGS. 2, 3, and 5.

Figure 8:
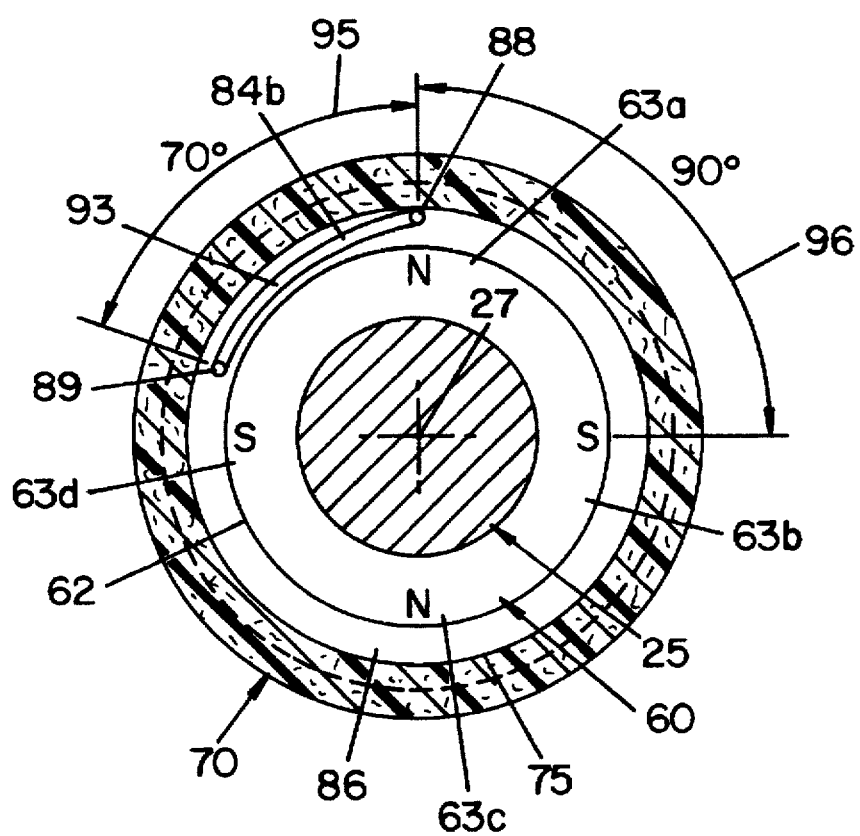
FIG. 8 is a cross-sectional view of the motor, partially in section.

Referring now to FIGS. 2, 8, and 9, there is provided a plurality of stator coils 84. For drawing clarity, only one (1) coil is illustrated in FIGS. 8 and 9 while sections of two (2) coils 84a, 84b, are illustrated in FIG. 2. In the preferred embodiment, the plurality of coils 84 equal in number the number of pole faces 63 in rotor permanent magnet 60. Each coil is situated in annular space 86 or physical air gap existing between exterior surface 62 of rotor permanent magnet 60 and cylindrical interior surface 75 of cylindrical housing motor portion 12. (Air gap as used herein refers to the "mechanical" air gap and not to the "magnetic" air gap serving as a path for magnetic flux as defined in the IEEE *Standard Dictionary of Electrical & Electronics Terms.*)

Each coil 84 is positioned within annular space 86 by conventional means such as adhesive and may optionally be encased within a coating (not shown). Each coil 84 is conventional in that it is comprised of an electrical conductor, or conductors (copper or aluminum) wound a predetermined number of turns into a self-sustaining shape or configuration. Specifically, each coil 84 is wound in the shape of a cylindrical polygon, more specifically a parallelogram, having parallel side conductor portions 88, 89 (best shown in FIG. 8) which are also parallel to the longitudinal center line 27 of stepped steel shaft 25. Further, the parallel end portions 90, 91 of coils 84 are arcuately shaped to have the curvature of annular space 86. That is, coils 84 are generally concentric with stepped steel shaft 25. The space in between parallel side portions 88, 89 of each coil 84 is thus free of any ferrite magnetic material. Further, end portions 90, 91 are physically removed from or spaced outside of cylindrical end surface 62 of rotor permanent magnet 60.

Importantly, the arcuate or radial width of each coil 84 as best shown in FIG. 8 by the arrow designated as reference numeral 95, is less than the arcuate or radial width of each pole face 63a–d of magnetic rings 60 designated by reference numeral 96 in FIG. 8. In the preferred embodiment, the arcuate width of each coil is 70° while the arcuate width (subtended width) of each pole face 63 is 90°. As a general rule, the arcuate width spanned by coil 84 is about ⅔ the width of the magnetized pole face. This dimensioning insures that all of the magnetic energy of end pole face 63a–d passes through each coil 84 while the Hall effect sensor arrangement described above insures accurate commutation.

Small electrical motors of about 2" in housing diameter built in accordance with the description above, have achieved efficiencies in excess of 80% at 10,000 rpm. Several design features disclosed above are believed to have resulted in the improved efficiency. First, the rotor permanent magnet design, including the combination of magnetic material selection coupled with a plurality of rings permit a pole-to-pole magnetization of the rotor magnets without experiencing ill-defined magnetic fields at adjacent poles. Thus, more magnetic energy is available in the present invention from the rotor's magnet than that of the prior art such as the Mihalko brushless DC motor. The rotor permanent magnet design, in turn, allows the coil design to span an arcuate distance less than that of the rotor's magnetic pole faces, in turn, resulting in all of the magnetic flux or a high percentage of the flux passing through coil 84. At the same time, accurate commutation and Hall effect sensing is assured vis-a-vis the positioning of coil 84 relative to the positioning of magnet rings 60 and Hall magnet assembly 42.

In combination with the improved rotor-coil arrangement, but somewhat separate (since the concept can be used in DC motors employing a rotor-stator coil design other than that disclosed), is the extremely effective shunt produced by housing modules 70. The shunt effectiveness is attributed not only to the selection of the specified sintered powder metal but also to the modularity of the housing design itself which prevents the establishment of an electrically active return path by providing for a high induction saturation of the magnetic flux with the result that the magnetic flux concentrates, passes in, or flattens out in the physical air gap or annular space 86 between rotor pole face 63 and electrical motor housing 12. Again, the shunt's effectiveness is materially enhanced by the modularity of motor housing 12. Simply doping the plastic housing with powder metal particles will not produce the effective shunt of the present invention and could result in an electrically conductive path which is prevented, vis-a-vis the adhesive connection between modules 70a, b and c. For this reason, the housings performance as a magnetic shunt is believed further enhanced by utilizing the preferred embodiment of FIG. 4 where inner and outer rings 80, 81 are adhesively secured to one another. At the same time, the design eliminates the wafer ferrite-oxide laminations of the prior art which not only increased the cost of the motor but also required special, tedious, time consuming assembling techniques, all of which are avoided in the present invention.

TABLE 1

| Magnequench Product | Residual Induction $B_r$ (kG) | Coercive Force $H_c$ (kOe) | Intrinsic Coercivity $H_{ci}$ (kOe) | Energy Product $(BH)_{max}$ (MGOe) | Temperature Coefficient $B_r$ to 100° C. (%/°C.) | Temperature Coefficient $H_{ci}$ to 100° C. (%/°C.) |
|---|---|---|---|---|---|---|
| MQ1-A 9H | 6.4 | 5.6 | 15.0 | 9.0 | −0.13 | −0.45 |
| MQ1-B 10 | 6.9 | 5.3 | 9.0 | 10.0 | −0.105 | −0.40 |

TABLE 1-continued

| Magnequench Product | Residual Induction $B_r$ (kG) | Coercive Force $H_c$ (kOe) | Intrinsic Coercivity $H_{ci}$ (kOe) | Energy Product $(BH)_{max}$ (MGOe) | Temperature Coefficient $B_r$ to 100° C. (%/°C.) | Temperature Coefficient $H_{ci}$ to 100° C. (%/°C.) |
|---|---|---|---|---|---|---|
| MQ1-C 9H | 6.3 | 5.6 | 16.0 | 9.0 | −0.07 | −0.40 |
| MQ1-D 10 | 6.8 | 5.7 | 10.5 | 10.0 | −0.07 | −0.40 |

NOTES: Magnetic properties are typical at room temperature.

TABLE 2

Magnetic Characteristics

| | |
|---|---|
| Residual Induction $B_r$ | 6.8 kG |
| Coercive Force $H_c$ | 5.7 kOe |
| Intrinsic Coercivity $H_{ci}$ | 10.5 kOe |
| Energy Product $(BH)_{max}$ | 10.0 MGOe |
| Recoil Permeability $\mu r$ | 1.22 G/Oe |
| Temperature Coefficient of $B_r$ to 100° C. | −0.07 %/°C. |
| Temperature Coefficient of $H_{ci}$ to 100° C. | −0.40 %/°C. |
| Required Magnetizing Force (open circuit) $H_s$ | 35 kOe |
| Maximum Operating Temperature* | 110° C. |

Physical Properties

| | |
|---|---|
| Coefficient of Thermal Expansion (25–200° C.) | $4.8 \times 10^{-6}$/°C. |
| Compressive Strength | 396 kg/cm$^2$ |
| Curie Temperature $T_c$ | 470° C. |
| Density | 6.1 g/cm$^3$ |
| Electrical Resistivity | 14000 μohm · cm |
| Hardness | 30 Rockwell-B |
| Transverse Rupture Strength | 320 kg/cm$^2$ |
| Poisson Ratio | 0.20 |
| Specific Heat | 0.42 W · sec/g · °C. |
| Thermal Conductivity | 0.02 W/cm °C. |
| Tensile Strength | 380 kg/cm$^2$ |
| Young's Modulus | $4.8 \times 10^5$ kg/cm$^2$ |

NOTE: Magnetic and physical properties are typical at room temperature.
*Maximum operating temperature is dependent upon permeance coefficient, coating, and environment.

The invention has been described with reference to a preferred embodiment. Obviously, modifications and alterations will occur to those skilled in the art upon reading and understanding the Detailed Description of the preferred embodiment as set forth above. It is intended to include all such modifications and alterations in-so-far as they come within the scope of the present invention.

Having thus defined the invention it is claimed:

1. A brushless, slotless motor comprising:

a rotor having a longitudinally-extending rotatable shaft, an annular permanent magnet affixed to said shaft and rotatable therewith, said magnet having a continuous, magnetized outer cylindrical edge surface defining a plurality of arcuate pole faces juxtaposed one another, each pole face having a polarity opposite that of an adjacent, juxtaposed pole face so as to generate high-intensity, substantially unidirectional magnetic field lines at said pole faces;

a plurality of coils corresponding in number to said plurality of pole faces and formed in a cylindrical array coaxial with and spaced radially outward from said cylindrical edge surface but closely juxtaposed thereto without any intervening ferromagnetic material between said coils, each coil having electrical conductors formed in an array of a predetermined number of turns and including at least two parallel sides with centerlines arranged generally parallel to said shaft;

each pole face having a circumferential dimension and each coil having a circumferential dimension between said parallel sides of about two-thirds the circumferential dimension of said pole face;

a housing surrounding said coils and rotor;

commutation sensing means for detecting the magnitude and polarity of the magnetic field produced by said magnet; and control means for providing power to selected coils in response to said sensing means.

2. The motor of claim 1 wherein said plurality of coils and said plurality of pole faces is an even number.

3. The motor of claim 2 wherein said pole faces are four in number, each pole face having a circumferential dimension of 90°, and the circumferential dimension of each coil being 70°.

4. The motor of claim 1 wherein said magnet has a maximum energy product, MGOe, of about 10 megagauss-oersteds.

5. The motor of claim 1 wherein said magnet comprises a plurality of cylindrical magnetic rings affixed side by side onto said shaft with pole faces and polarities aligned with one another and extending a longitudinal distance approximately equal to that of said coil's parallel sides.

6. A brushless, slotless motor comprising:

a rotor having a longitudinally-extending rotatable shaft, an annular permanent magnet affixed to said shaft and rotatable therewith, said magnet having a continuous, magnetized outer cylindrical edge surface defining a plurality of arcuate pole faces juxtaposed one another, each pole face having a plurality opposite that of an adjacent, juxtaposed pole face so as to generate high-intensity, substantially unidirectional magnetic field lines at said pole faces;

a plurality of coils formed in a cylindrical array spaced radially outward from said cylindrical edge surface but closely juxtaposed thereto without any intervening ferromagnetic material between said coils, each coil having electrical conductors formed in an array of a predetermined number of turns and including at least two parallel sides with centerlines arranged generally parallel to said shaft;

a housing surrounding said coils and rotor, said housing being cylindrical and having an inner cylindrical surface closely juxtaposed said coils, said coils being the only conductive material between said inner surface of said housing and said outer surface of said rotor, said housing comprising sintered, powder metal dispersed within a plastic for said housing to function as a flux return path to minimize hysterisis and eddy current losses while causing magnetic flux to pass through the annular space between said rotor and housing containing said coils without the need of separate disc laminations;

commutation sensing means for detecting the magnitude and polarity of the magnetic field produced by said magnet;

control means for providing power to selected coils in response to said sensing means; and, said housing comprising a plurality of ring shaped modules each having a smaller male end and a larger female end so that said male end of one module fits within the female end of an adjacent module, each module being formed in part of metallic material acting as a shunt whereby the efficiency of said motor is enhanced.

7. The motor of claim 6 wherein each housing module includes an annular female member adjacent said female end and an annular male member adjacent said male end, the outside diameter of said male member approximately equal to the inside diameter of said female member, said male member longitudinally extending a fixed distance within said female member and sealed thereto whereby said modules when assembled to form said housing provide a smooth, continuous inner surface closely juxtaposed said coils.

8. An improved brushless motor comprising:

a housing of plastic material containing sintered metal in the plastic material for providing a magnetic flux return path;

a rotor including a rotatable shaft and a cylindrical permanent magnet mounted to said shaft and rotatable therewith, said magnet having a continuous magnetized cylindrical outer edge surface, said outer edge surface defining a plurality of arcuate side-by-side pole faces generating uni-directional magnetic flux lines, each pole face having a circumferential dimension and a polarity opposite that of an adjacent pole face, said housing and said pole faces being radially spaced and defining an annular space therebetween; and, a plurality of coils corresponding in number to said plurality of pole faces and formed in a cylindrical array in said annular space, each coil formed of electrical conductors without ferromagnetic material therebetween, said electrical conductors formed into a predetermined number of turns including at least two parallel sides with centerlines arranged generally parallel to said shaft, and each coil having a circumferential dimension between said parallel sides less than said circumferential dimension of said pole face.

9. The improved motor of claim 8 wherein said magnet has a maximum energy product, MGOe, of about 10 megagauss-oersteds.

10. The improved motor of claim 8 wherein said magnet includes a plurality of rings of magnetic material, each ring having said plurality of said pole faces, said rings aligned and affixed to said shaft to longitudinally extend side-by-side so that each ring's pole faces have the same polarity as an adjacent ring.

11. The motor of claim 8 wherein said housing includes a plurality of ring shaped modules each having a smaller male end and a larger female end so that said male end of one module fits within the female end of an adjacent module.

12. The motor of claim 11 wherein said modules are glued together to form said flux return path.

13. The motor of claim 12 wherein each housing module includes and annular female member adjacent said female end and an annular male member adjacent said male end, the outside diameter of said male member approximately equal to the inside diameter of said female member, said male member extending a fixed distance within said female member and sealed thereto whereby said modules when assembled into said housing provides a smooth, continuous inner surface juxtaposed said coils.

14. A hand held motor comprising a motor portion including a brushless D.C. motor comprising:

a rotor including a steel shaft having an axis and an annular, cylindrical permanent magnet affixed thereto, said magnet having a circumferential outer edge surface coaxial with said axis and magnetized to form a plurality of pole faces extending about said edge surface, each pole face having a circumferential dimension and being juxtaposed an adjacent pole of opposite polarity and having a coercive force generating a substantially unidirectional flux field;

a housing coaxial with and surrounding said magnet and defining an annular air gap therebetween, said housing being plastic and impregnated with powder metal particles forming a metallic shunt whereby said magnetic field is concentrated in said air gap;

a plurality of coils formed in a cylindrical array within said air gap and coaxial with said axis, each coil including an electrical conductor formed in a polygonal array having a predetermined number of turns and including at least two coils parallel with said shaft and each having a circumferential dimension less than said circumferential dimension of said pole face;

commutation sensing means for detecting the magnitude and polarity of said pole faces;

means for generating current to selected coils actuated by said commutation sensing means for rotating said shaft; and, an adaptor portion for carrying a tool coupled to said shaft for rotating and transmitting torque supplied by said shaft.

15. The motor of claim 14 wherein said housing includes a plurality of ring shaped modules each having a smaller male end and a larger female end so that said male end of one module fits within the female end of and adjacent module.

16. The motor of claim 15 wherein said magnet has a maximum energy product, MGOe, of about 10 megagauss-oersteds.

17. The motor of claim 16 wherein one of said female and male members includes a gap at one of its ends for retaining a chemical sealant when said female member and said male member are glued to one another.

18. The motor of claim 14 wherein said pole faces are four in number, each pole face having a circumferential dimension of 90° and the circumferential dimension of each coil being 70°.

19. The motor of claim 14 wherein said magnet includes a plurality of rings of magnetic material, each ring having said plurality of said pole faces, said rings aligned and affixed to said shaft to longitudinally extend side-by-side so that each ring's pole faces has the same polarity as and adjacent ring.

20. The motor according to claim 14, wherein said circumferential dimension of said coil is about two-thirds said circumferential dimension of said pole face.

* * * * *